(12) United States Patent
Harding et al.

(10) Patent No.: US 8,508,589 B2
(45) Date of Patent: Aug. 13, 2013

(54) IMAGING SYSTEMS AND ASSOCIATED METHODS THEREOF

(75) Inventors: Kevin George Harding, Niskayuna, NY (US); Robert John Filkins, Niskayuna, NY (US); Gil Abramovich, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 430 days.

(21) Appl. No.: 12/871,538

(22) Filed: Aug. 30, 2010

(65) Prior Publication Data

US 2012/0050517 A1 Mar. 1, 2012

(51) Int. Cl.
*H04N 7/18* (2006.01)

(52) U.S. Cl.
USPC .................................. 348/79; 348/61; 348/80

(58) Field of Classification Search
USPC ............................... 348/61, 79, 80
See application file for complete search history.

(56) References Cited

U.S. PATENT DOCUMENTS

| | | | |
|---|---|---|---|
| 3,536,921 A | 10/1970 | Caulfield | |
| 4,985,285 A | 1/1991 | Ichikawa et al. | |
| 5,963,532 A * | 10/1999 | Hajjar | 369/112.24 |
| 6,344,930 B1 | 2/2002 | Kaneko et al. | |
| 6,741,356 B1 * | 5/2004 | Ishiwata et al. | 356/491 |
| 7,158,317 B2 | 1/2007 | Ben-Eliezer et al. | |
| 7,161,656 B2 | 1/2007 | Neil et al. | |
| 7,522,278 B2 | 4/2009 | Kaminsky | |
| 2007/0069106 A1 | 3/2007 | Krief et al. | |
| 2007/0159701 A1 | 7/2007 | Campbell et al. | |
| 2010/0027110 A1 | 2/2010 | Ikeda et al. | |

FOREIGN PATENT DOCUMENTS

| | | |
|---|---|---|
| EP | 0701149 A2 | 3/1996 |
| WO | 2010015563 A1 | 2/2010 |

OTHER PUBLICATIONS

Search Report and Written Opinion from corresponding PCT Application No. PCT/EP2011/064770 dated Dec. 15, 2011.

* cited by examiner

*Primary Examiner* — Sath V Perungavoor
*Assistant Examiner* — Geepy Pe
(74) *Attorney, Agent, or Firm* — Jenifer W. Haeckl

(57) ABSTRACT

Imaging systems and methods for generating images of a sample wherein the system comprises an illumination source for illuminating the sample; an image viewing subsystem for capturing images from the sample; one or more liquid crystal panels and one or more birefringent elements, which are positioned between the sample and the image viewing subsystem, so that the images from the sample pass through the liquid crystal panels and the birefringent elements before reaching the image viewing subsystem; a device that changes one or more polarization states of the liquid crystal panels; and a controller that is configured to cause the device to change the polarization states of the liquid crystal panels.

21 Claims, 3 Drawing Sheets

IMAGING SYSTEMS AND ASSOCIATED METHODS THEREOF

FIELD

The invention relates to optical imaging systems and methods for imaging a sample.

BACKGROUND

The microscope is a widely used tool for research and diagnostics, particularly in the field of cellular biology, cytology and pathology. Use of the microscope is well known for detecting cultured cells or tissues that are untreated or treated with imaging agents, reagents or drugs, and tissue samples collected from a normal or a diseased individual. For example, in cancer research, microscopic analysis helps in detecting and quantifying genetic alterations that result from the progression of cancer. Digital microscopes are used to examine cellular morphology, the expression of specific genes, (e.g., gene amplification, gene deletion, gene mutation), and the expression of encoded proteins. The microscopic analysis of individual cells or entire histological sections on tissue micro arrays is widely known.

Microscopy is routinely used for rapid investigations at the cellular and sub-cellular levels but there are limitations to conventional microscopy associated with subjectivity and repeatability. Systems have been developed to generate 2-dimensional (2D) images, but these often do not provide an entire representation of the sample due to the limitation in the depth of focus with conventional imaging techniques. Systems have also been developed that generate a composite image simulating an extended depth of focus, by acquiring multiple images at multiple focal planes and selecting and combining the best, in-focus portions of the images. However, the ability of such systems to rapidly generate a composite image, especially in real time, is limited because of the need to rapidly shift the focal position of the imaging system before capturing the digital images. The ability to rapidly generate a well-focused image is further limited by the need to post-process the stack of images into a composite image for viewing. Currently available digital imaging system and devices typically include cameras, piezo-objectives, piezoelectric stages, motorized stages, and linear objective turrets. However, none of these systems are capable of rapid image acquisition and generation.

An improved device for visual analysis of samples that combines the microscope with automatic imaging provisions with high focus quality and repeatability is desirable. There exists a need for an imaging system and a method for rapid focusing of an imaging system for obtaining a complete, in-focus, microscopic image over the entire thickness of the sample of interest, which may be used for static high-resolution object recapture as well as for continuous motion high resolution image viewing. Such an imaging system and method should desirably be cost effective, have relatively simple equipment requirements, and be readily adaptable to various magnifications.

BRIEF DESCRIPTION

The invention relates to methods and imaging systems that are capable of real-time, rapid generation of images of samples.

One embodiment of an imaging system of the invention, for generating images of a sample, comprises an illumination source for illuminating the sample, an image viewing subsystem for viewing images formed from the sample, one or more tunable optical wave plates, and one or more birefringent elements, which are positioned between the sample and the image viewing subsystem, so that the images of the sample pass through the tunable optical wave plates and the birefringent elements before reaching the image viewing subsystem, a device that changes one or more phase retardation states of the tunable optical wave plates resulting in a change of one or more polarization states of the image, and a controller that modifies the device to change the phase retardation of the tunable optical wave plates.

In one example of the method of the invention, for imaging a sample by an imaging system comprises: illuminating the sample, directing an image from the sample through the imaging system, wherein the imaging system comprises one or more liquid crystal panels or LCPs, one or more birefringent elements, a controller that modifies one or more phase retardation states of the LCPs to modify a focal distance of the image, and an image viewing subsystem; generating a plurality of images of the sample; viewing the images with the image viewing subsystem.

Another embodiment of the imaging system for generating images of a sample, comprises: an illumination source for illuminating the sample; an image viewing subsystem for viewing images from the sample; a plurality of LCPs; and a plurality of birefringent elements, which are positioned between the sample and the image viewing subsystem, so that the images from the sample pass through the LCPs and the birefringent elements before reaching the image viewing subsystem; a device that changes phase retardation states of the LCPs to change the state of polarization of the image; a controller that modifies the device to change phase retardation states of the LCPs; and an image processor subsystem coupled to the image viewing subsystem to generate a composite image from two or more of the images, wherein the images are formed at predetermined focal distances at a rate in a range from about 15 images/second to 100 images/second.

One embodiment of the imaging system generates a series of images at varying focal distances at a rate that is faster than an integration time of an associated viewing system, to form a viewable composite image from the series of images at multiple focus depths.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more of the embodiments of the imaging systems generate multiple images of a sample in a short period of time. The use of the imaging systems enhances the quality of the images captured at high speed and enables a user to view real time images.

To more clearly and concisely describe and point out the subject matter of the claimed invention, the following definitions are provided for specific terms, which are used in the following description and the appended claims. Throughout the specification, use of specific terms should be considered as non-limiting examples.

The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Where necessary, ranges have been supplied, and those ranges are inclusive of all sub-ranges there between.

As used herein, "birefringent element" refers to an element whose optical path length is dependent upon the orientation of the polarization of the light and may be referred to as a birefringent window or lens depending on the geometry.

Figure 2:
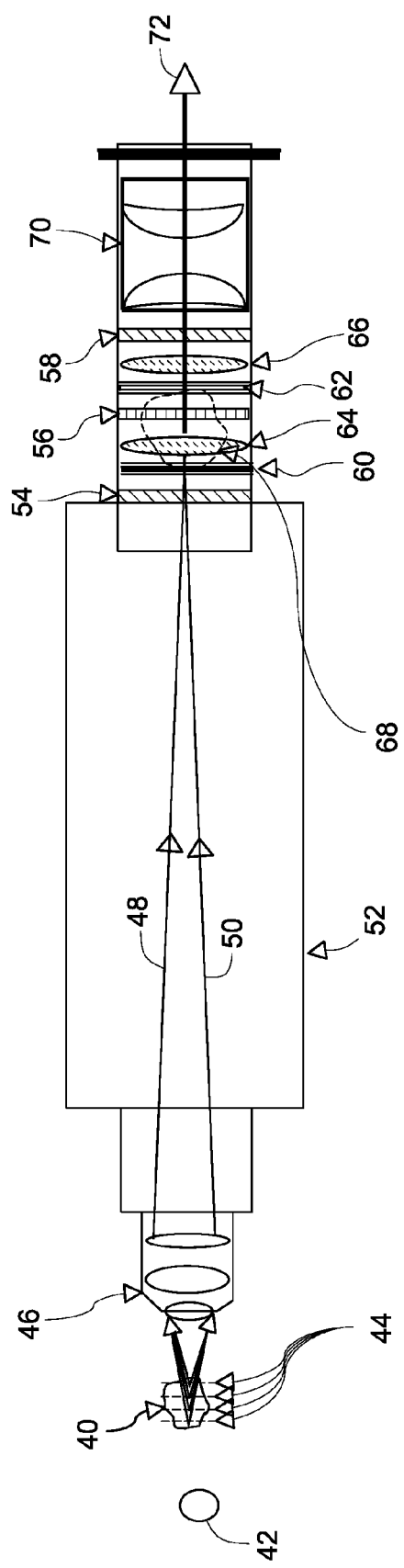
FIG. 2 is a schematic drawing of an embodiment of an imaging system of the invention.

The imaging system for generating images of a sample comprises an illumination source for illuminating the sample, an image viewing subsystem for viewing images formed from the sample, one or more tunable optical wave plates, and one or more birefringent elements. An embodiment of the imaging system is generally shown in FIG. 2. In this embodiment, the tunable optical wave plates comprise one or more LCPs, one or more birefringent elements, a device that changes one or more phase retardation states of the LCPs, and a controller that is configured to modify the device to change the phase retardation of the LCPs.

The imaging system further comprises an illumination source and an image viewing subsystem. In one embodiment, the image viewing subsystem captures images of the sample. The captured images may be reflected images or transmitted images. In one or more embodiments, the imaging system further comprises an image processor subsystem, which is coupled to the image viewing subsystem.

The illumination source illuminates the sample and directs the reflected light or transmitted light or both through the imaging system to generate an image. The illumination source is generally located underneath a platform, which supports the sample. In some embodiments, the illumination source emits light at a plurality of wavelengths. The illumination source may comprise a wavelength tuner capable of adjusting the output light within at least two wavelength regions. For example, the wavelength regions may comprise a red light component and a blue light component. The light may be provided and controlled in a variety of ways. In one embodiment, the imaging system has a controllable light source that is focused through an optical device referred to as a condenser, with diaphragms and filters to manage the quality and intensity of the light. In one embodiment, one or more LCPs may be configured as optical wave plates, which functions as a wavelength tuner for the light generating from the illumination source. The reflected or transmitted light from the sample passes through the imaging system, that comprises LCPs and birefringent elements, as one or more images.

The LCPs and birefringent elements in combination serve as variable focus lenses. The focus of the variable focus lenses may be individually adjusted by switching into two or more orientations of the phase retardation states of the LCPs. The alignment angles of the liquid crystals change with a change in applied electic field by changing voltage of the LCPs. For example, for two specific control voltage states, the crystals are aligned in distinct orientations providing different refractive indices. The change in voltage of the LCPs results in a change in the phase retardation. Therefore, an image propagates through the LCP-media results in a change in the polarization orientation of the image.

The device that changes the phase retardation of the LCPs is a voltage source. The voltage source applies variable voltage to the electric field in order to modify the phase retardation states of the LCPs. Non-limiting examples of the voltage source include batteries, LEDs, Zener diodes, potentiometers and capacitors. The voltage source may be regulated by a controller to increase or decrease the voltage of the electric field generated by the voltage source for applying to the LCPs.

The controller is configured to modify the electric field and to change the polarization effects of the LCPs. By altering one or more phase retardation states of the LCPs, the controller facilitates transferring the image-forming light rays between or along different axes of the birefringent element(s), in order to achieve different focal properties of the image forming system. The controller may be configured to increase or decrease the focal distance of the image. The controller controls the voltage source to direct the liquid crystal switching of the LCPs. The change in polarization of the images results from a switching of the liquid crystals of the LCPs in concert with the birefringent elements.

The birefringent elements are able to change the optical path depending on the polarization. The birefringent elements may be selected from birefringent windows, birefringent lenses, birefringent prisms or beam splitters. For example, birefringent lenses or beam splitting prisms may achieve a significant change in focus position. The birefringent elements are capable of generating a plane polarized image.

A series of discrete plane polarized images are generated at a rate in a range from about 2 images/second to 200 images/second, however, a higher rate may also be implemented depending on the application of the imaging system. In a specific embodiment, the series of discrete plane polarized images are generated at a rate in a range from about 15 images/second to 100 images/second. In one embodiment, the imaging system generates a series of images at varying focal distances at a rate that is faster than an integration time of an associated viewing system, to form a viewable composite image from the series of images at multiple focus depths.

The series of images are generated after passing through the LCPs and birefringent elements. In the imaging system, the LCPs and the birefringent elements are positioned between the sample and the image viewing subsystem, so that the images generated from the sample pass through the LCPs and the birefringent elements, before reaching the image viewing subsystem. In this embodiment, the LCPs and the birefringent elements are positioned along an optical axis of the system to change the optical path lengths of the images. The optical axis is situated generally along the propagating path of light. The optical axis of the system comprises the sample and the image viewing subsystem along with the LCPs and the birefringent elements.

In some embodiments, the LCPs comprise a first LCP and a second LCP, and the birefringent elements comprise a first birefringent element and a second birefringent element, wherein the first LCP, the second LCP, the first birefringent element, and the second birefringent element are disposed between the sample and the image viewing subsystem. The first LCP is disposed between the sample and the first birefringent element, the first birefringent element is disposed between the first LCP and the second birefringent element, the second birefringent element is disposed between the first birefringent element and the second LCP, and the second LCP is disposed between the second birefringent element and the image viewing subsystem. In one or more embodiments, the first LCP receives an incident image, and the second LCP receives an image processed through the first LCP, first birefringent element and the second birefringent element. In one embodiment, the first birefringent element receives an image processed through the first LCP, and the second birefringent element receives an image processed through the first LCP and the first birefringent element.

The imaging system further comprises one or more polarizers disposed along the optical axis. In one embodiment, the polarizers comprise a first polarizer, a second polarizer, and a third polarizer. The first LCP, the second LCP, the first birefringent element, the second birefringent element, the first polarizer, the second polarizer, and the third polarizer are disposed between the sample and the image viewing subsystem. In some embodiments, the first polarizer is disposed between the sample and the first LCP, the second polarizer is disposed between the first birefringent element and the second birefringent element, and the third polarizer is disposed between the second LCP and the image viewing subsystem. The change in a focal distance of the image passing through the imaging system results from the change in phase retardation states of the LCPs and the polarization states of the polarizers.

In one embodiment, the first polarizer, the second polarizer or the third polarizer are positioned at an angle of 90 degrees with reference to the optical axis. Each of the polarizers comprises a polarization axis, which is rotated with reference to the optical axis. For at least one polarizer, the polarization axis is rotated with reference to the optical axis at about 90 degrees, about 45 degrees or at any other angle relative to the fast first axis of the LCP or polarization axis of the other polarizers present in the system. In one embodiment, at least one of the first polarizer, second polarizer or third polarizer is positioned at an angle of less than about 90 degrees with reference to the optical axis relative to the first axis of the LCP or polarization axis of the other polarizers in the system. In another embodiment, at least one of the first polarizer, second polarizer or third polarizer is positioned at an angle of less than about 45 degrees with reference to the optical axis relative to the first axis of the LCP or polarization axis of the other polarizers present in the system. The 'other polarizers' as mentioned herein, for example, refer to the second polarizer and third polarizer, wherein the first polarizer is positioned at an angle of about 90 degrees with reference to the optical axis relative to the fast first axis of the LCP or polarization axis of the second polarizer and third polarizer present in the system.

The plane polarized images may be viewed or captured by the image viewing subsystem. The image may be directly viewed by human eye, imaged on a photographic plate or captured digitally. The image viewing subsystem may be an image capture subsystem, in one embodiment. For example, the image capture subsystem may be composed of a camera or a similar device, which captures the images of the sample (subject) and produces the captured image data on the basis of time or spatial parameters. The image capture subsystem may comprise additional components typically found in optical systems such as, but not limited to, additional lenses, mirrors, light filters, apertures, illuminating devices and electronic components.

In one embodiment, while the image viewing subsystem is an image capture subsystem, the non-limiting examples of image capture subsystem is a still camera, or an electronic motion camera. The camera may include a charged-coupled device camera (CCD camera) or complimentary metal-oxide semiconductor (CMOS) camera, which is focused on the target of interest, such as a biological sample. The image may be shown on a computer screen while the camera is in communication with the computer. In one embodiment, a color CCD or CMOS camera may be used to image the sample, wherein three gray level images of the sample are simultaneously captured. In one embodiment, the imaging step may comprise multi-spectral imaging using substantially real time processing of the sample (for example, about 40 millisecond per image). For real time processing or display purposes, in the case of an RGB camera, the image acquisition through the different channels of RGB is performed in parallel and look up tables (LUT) may be generated that map the RGB color input values to pre-determined concentrations and/or transmittances of each of the colors involved. In one embodiment, the image capture or image viewing subsystem is a video CCD or CMOS camera, where the images are generally balanced and normalized using an empty field as a reference and a black field as an image, and corrected for variations in shading.

In one or more embodiments, the image processing subsystem is configured to process a series of discrete images formed at a plurality of focal distances to generate a composite image. The image-processing subsystem may be operationally coupled to the image viewing subsystem. A digital image may be computed from a geometric model or mathematical formula by image synthesis. In one embodiment, the image processing subsystem is capable of calculating the depth of structural features of the sample in part by focus or defocus algorithms, and generating a 2D image of the sample from the calculated depth of the structural features. After capturing the image, the data may be transferred to the image processing subsystem for processing the image and obtaining or generating three dimensional (3D) depth information. The 3D depth information may be further processed to create a 2D type image from the calculated depth of the structural features and the high-resolution composite image. In one embodiment, an algorithm is used for processing the image by simulating the image-distortions or motion corrections.

In one embodiment, the imaging system may comprise one or more imaging elements, such as a lens having a fixed optical path length and a focal point. The LCPs and the birefringent elements may be positioned between the sample and the imaging element to change the optical path length of the image.

The imaging system may comprise a platform below the object or the sample, which supports the sample being viewed. In the center of the platform is a hole through which the light passes to illuminate the sample specimen. The sample may be supported directly by the platform or may be mounted on a disposable and/or portable carrier such as a slide or tissue micro array that is supported by the platform.

One or more of the illumination source, LCPs, birefringent elements, device that changes the phase retardation states of the LCPs, controller that modifies the device to change the phase retardation states of the LCPs to change polarization states of the images, image viewing subsystem and image processor may all be integrated in a microscope or a larger or more complex imaging system. The microscope may be a manual microscope, digital microscope, auto-focusing microscope and/or real-time micro scope.

The imaging system may be used to image a sample that comprises a biological specimen. The biological sample or specimen refers to a sample obtained from a biological subject, including, but not limited to, cells, biological tissue, such as tissue sections, tissue samples, biopsies, tissue imprints after some cytological preparations, skin or tissue grafts collected from a biological subject, organs or parasites.

An example of a method of the invention for imaging a sample, using an imaging system of the invention, generally comprises: illuminating the sample and directing an image from the sample through the imaging system, modifying one or more phase retardation states of one or more of the LCPs to modify a focal distance of the image, and generating a plurality of plane polarized images of the sample.

In some examples, the method further comprises registering the plane polarized images to form a plurality of registered plane polarized images; and combining the registered plane polarized images to form a composite image. Registering the plane polarized images may comprise ortho-rectification. Ortho-rectification transforms the central projection of the image into an orthogonal view, thereby removing the distortion caused by tilt and/or environmental effects.

In one example, the focused images may be combined in part by digitally extending the depth-of-field of a stack of images, sometimes referred to as "extended focus". A rapid series of focal shifts occur without changing the position of the sample. By rapidly switching the focal distances, a user or an automated system may determine specific depths within a sample quickly and repeatably, and may generate a series of discrete images similar to a real time movie. In one embodiment, a series of 100 discrete images can be generated in one second, by rapidly switching the focal distances.

In some embodiments, a camera system may be used to capture the images. A composite image may be generated from the captured images using convolution-based methods to combine one or more portions of each image (e.g. in focus). For example, two or more consecutive frames of the same field at different focus distance may be combined or fused to generate the final composite image with the maximum contrast in each pixel of the image.

Figure 1:
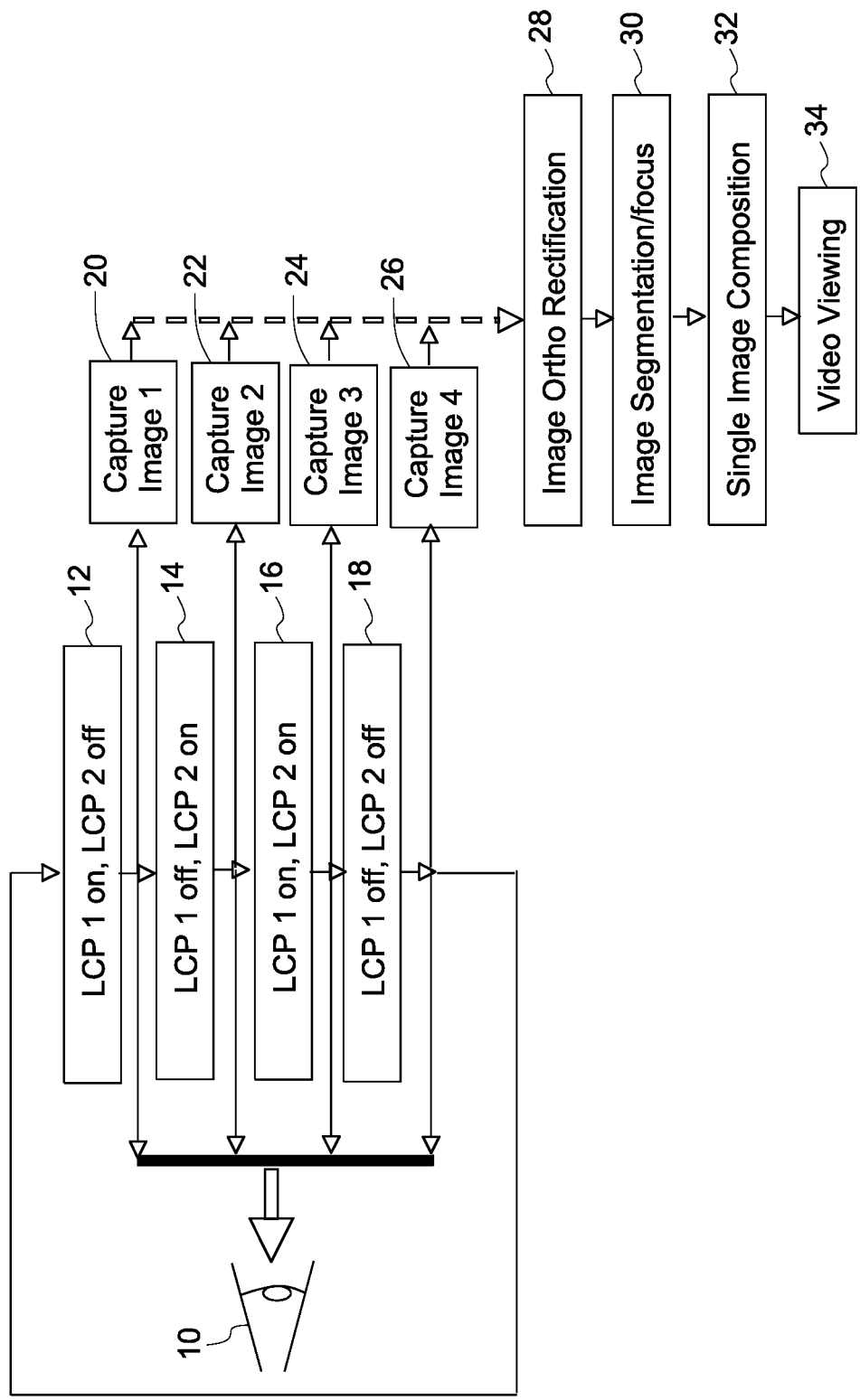
FIG. 1 is a flow diagram of an example of a method for continuous real time imaging of a sample using an imaging system of the invention.

An example of a method comprising continuous real time viewing 10 of the sample is shown in FIG. 1. Before generating a composite single image, four different images are captured under four different conditions, such as 12, 14, 16 and 18. In example 12, when the first LCP is 'on', and the second LCP is 'off' in 12, the first LCP changes the polarization state of the image that passes through the first LCP, and the image further passes through the second LCP without having any change in optical property of the image. In example 14, the first LCP is 'off', and the second LCP is 'on'. The image passes through the first LCP without changing a polarization state of the image, wherein the second LCP changes the polarization state of the image. In example 16, both the first and the second LCPs are 'on', the LCPs change the polarization state of the image that passes through the first and the second LCPs. In example 18, both the first and the second LCPs are 'off'. The image passes through the imaging system without changing the polarization state of the image.

The images that pass through the LCPs are viewed or captured by the image viewing subsystem. The image in example 12 is captured image 20 (FIG. 1), the image in example 14 is captured image 22, the image in example 16 is captured image 24, and the image in example 18 is captured image 26. In operation, the electro-optical components, comprising the LCPs and the birefringent elements, are capable of quickly switching the polarization states of the LCPs, which results in the focal distance being rapidly changed as the images are captured in a series. Therefore, a series of plane polarized images such as 20, 22, 24, and 26 are taken at various focus distances, in this example, at a rate of at least about 15 images per second. These imaging steps may be viewed directly by the operator in real time as an in-focus image at multiple depths at the same time. The series of images may also be captured sequentially and viewed as a movie of images.

The captured images 20, 22, 24, and 26 may be further processed by an image processor. The image processor may be configured to carry out various image processing steps. For example, the processor carry out image ortho rectification 28, which transforms the central projection of the image to an accurate orthogonal projection of the image to remove distortion caused by movement or other environmental conditions. The image processor may also carry out image segmentation or focus determination 30. For example, the series of discrete images (e.g. 20, 22, 24, and 26) are taken at various focus distances. The image processor may then generate a single composite image or multiple composite images in step 32, using convolution-based methods to combine the best or selected portions of the captured images. Digital enhancement may also comprise convolution and/or background subtraction methods to improve the contrast of in-focus regions.

An embodiment of an imaging system of the invention is shown in FIG. 2. In this example, the subject (or sample) 40, is placed at one end of the imaging system. The illumination source 42 directs the light towards the sample and illuminates the sample 40. Images of the sample may be captured in multiple focal planes 44. The microscope comprises objective lens assembly 46. For illumination, the light passes through the filter at the desired range of wavelengths or frequencies, then through sample 40 and then to the objective lens 46. The reflected or transmitted light (image) rays 48 and 50 are directed from the subject and passed through the focusing tube 52. The image then passes through polarizers 54, 56, and 58; LCPs 60 and 62; and birefringent elements 64 and 66, to generate optical image 68. The polarizers, LCPs and birefringent elements are aligned along the optical axis defined by sample 40 and, in this example, eyepiece 70. The images are captured by image viewing device 72. The system is in-line with objective lens 46 and focusing tube 52.

Figure 3:
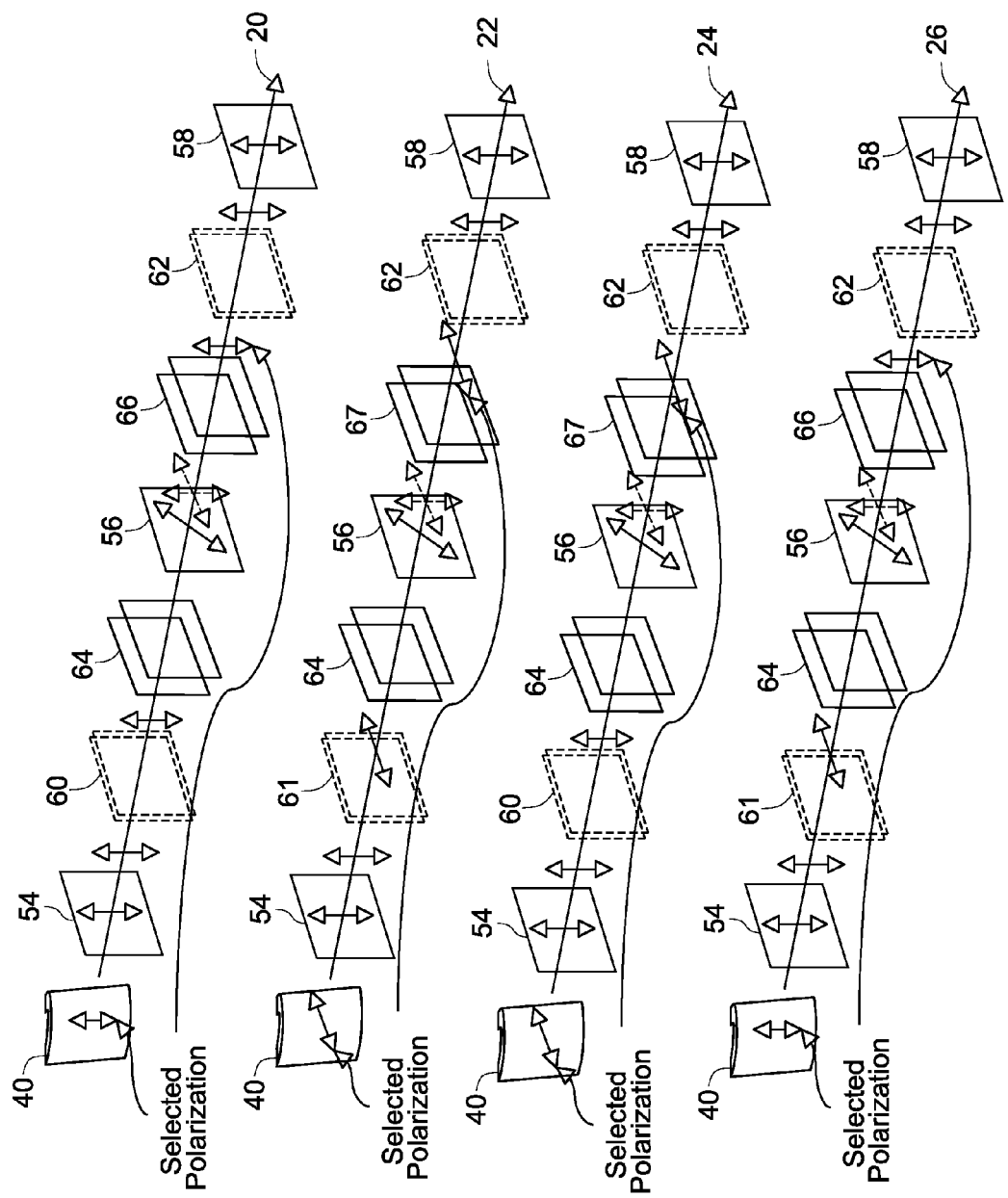
FIG. 3 is a flow diagram of an example of a method for generating multiple images at various focal planes using an imaging system of the invention.

FIG. 3 illustrates the switching flow mechanism. In this example, the reflected (or transmitted) image of the sample passes through the first polarizer 54, which is positioned at 90 degrees to the optical axis and also to the polarization axes of the other polarizers. The image passes unaltered through the first LCP unit 60 or in its original vertically polarized state. In another embodiment, the first LCP unit 61 rotates the light, making it horizontally polarized. After the light passes through the first LCP to the first birefringent element 64, there may be a difference in the index of refraction for the case of horizontally polarized light with respect to the vertically polarized light. The difference in the index of refraction results in shifting of the focus distance of the images. The image then passes through a second polarizer 56, which is oriented at 45 degrees to the optical axis relative to the polarization axis of the first (54) and the third polarizers (58), allowing the transmission of the same amount of light from each polarization. Then, the light passes through the second birefringent element 66, wherein the light passes through it in a vertically polarized state. In another embodiment, the second birefringent element 67 rotates the light, making it horizontally polarized. The light processed through the second birefringent element then passes through a second LCP 62 and a third polarizer 58. In each case, the image viewing subsystem captures the images as 20, 22, 24 and 26.

For the purpose of biological imaging, the imaging system may be in-line with an optical system comprising LCPs, birefringent elements, and polarizers; and the objective lens (46) and the focusing tube (52). In operation, the optical system quickly switches the focal planes of the images and the images may be directly viewed from the imaging system as in-focus images at multiple depths at the same time. The images may also be captured as a series of images and viewed as a movie.

The invention claimed is:

1. An imaging system for generating images of a sample, comprising:
   an illumination source for illuminating the sample;
   an image viewing subsystem for viewing the images formed from the sample;
   one or more tunable optical wave plates and one or more birefringent elements, which are positioned between the sample and the image viewing subsystem, so that the images from the sample pass through the tunable optical wave plates and the birefringent elements before reaching the image viewing subsystem, wherein the tunable optical wave plates comprise a first liquid crystal panel and a second liquid crystal panel, and the birefringent elements comprise a first birefringent element and a second birefringent element;
   one or more polarizers,
   a device that changes one or more phase retardation states of the tunable optical wave plates resulting in a change of one or more polarization states of the image; and
   a controller that modifies the device to change the phase retardation states of the tunable optical wave plates;
   wherein the first liquid crystal panel is disposed between the sample and the first birefringent element, the first birefringent element is disposed between the first liquid crystal panel and the second birefringent element, the second birefringent element is disposed between the first birefringent element and the second liquid crystal panel, and the second liquid crystal panel is disposed between the second birefringent element and the image viewing subsystem, and wherein the first liquid crystal panel, the second liquid crystal panel, the first birefringent element, the second birefringent element and the polarizers are disposed between the sample and the image viewing subsystem along an optical axis comprising the sample and the image viewing subsystem, so that a focal distance of a reflected image passing through the imaging system has one or more different values based on the phase retardation of the first liquid crystal panel, the second liquid crystal panel, and the polarization states of the polarizers.

2. The imaging system of claim 1 wherein the polarizers comprise a first polarizer, a second polarizer, or a third polarizer.

3. The imaging system of claim 2, wherein the first polarizer, the second polarizer, or the third polarizer are positioned at an angle of 90 degrees to the optical axis.

4. The imaging system of claim 2, wherein at least one of the first polarizer, the second polarizer, or the third polarizer is positioned at an angle of about 90 degrees relative to the polarization axis of other polarizers.

5. The imaging system of claim 2, wherein at least one of the first polarizer, the second polarizer, or the third polarizer is positioned at an angle of about 45 degrees relative to the polarization axis of other polarizers.

6. The imaging system of claim 2, wherein the first polarizer is disposed between the sample and the first liquid crystal panel, the second polarizer is disposed between the first birefringent element and the second birefringent element, and the third polarizer is disposed between the second liquid crystal panel and the image viewing subsystem.

7. The imaging system of claim 1 generates a series of discrete plane polarized images at predetermined focal distances at a rate in a range from about 15 images/second to 100 images/second.

8. The imaging system of claim 7, wherein a composite image is generated from the series of discrete plane polarized images.

9. The imaging system of claim 1, wherein the illumination source emits light at a plurality of wavelengths.

10. The imaging system of claim 1, wherein the birefringent elements are selected from birefringent windows, birefringent lenses, birefringent prisms, or beam splitters.

11. The imaging system of claim 1, wherein the device comprises a voltage source that changes the phase retardation states of the tunable optical wave plates.

12. The imaging system of claim 1, wherein the illumination source, the tunable optical wave plates, the birefringent elements, the device that changes the phase retardation states of the tunable optical wave plates, the controller that modifies the device to change the phase retardation states, and the image viewing subsystem are integrated in a microscope.

13. The imaging system of claim 12, wherein the microscope further comprises an image processor subsystem.

14. The imaging system of claim 12, wherein the microscope is selected from a manual microscope, a digital microscope, an auto-focusing microscope, and a real-time microscope.

15. The imaging system of claim 1, wherein the sample comprises a biological sample.

16. A method of imaging a sample by an imaging system, comprising:
   illuminating the sample;
   directing an image from the sample through the imaging system, comprising one or more liquid crystal panels, one or more birefringent elements, one or more polarizers, a controller that modifies one or more phase retardation states of the liquid crystal panels to modify a focal distance of the image, and an image viewing subsystem, wherein the liquid crystal panels, the birefringent elements, and the polarizers are disposed between the sample and the image viewing subsystem along an optical axis comprising the sample and the image viewing subsystem, such that a focal distance of the reflected image passing through the imaging system has different values based on the phase retardation of the liquid crystal panels, and the polarization states of the polarizers;
   generating a plurality of images of the sample, and
   viewing the images with the image viewing subsystem.

17. The method of claim 16, further comprising registering the images to form a composite image.

18. The method of claim 17, wherein the registering comprises ortho-rectification.

19. An imaging system for generating images of a sample, comprising:
   an illumination source for illuminating the sample;
   an image viewing subsystem for viewing images from the sample;
   a plurality of liquid crystal panels, a plurality of polarizers and a plurality of birefringent elements, which are positioned between the sample and the image viewing subsystem along an optical axis comprising the sample and the image viewing subsystem, so that the images from the sample pass through the liquid crystal panels and the birefringent elements before reaching the image viewing subsystem and so that a focal distance of a reflected image passing through the imaging system has one or more different values based on a phase retardation of the liquid crystal panels, and one or more polarization states of the polarizers;

a device that changes one or more phase retardation states of the liquid crystal panels to change the state of polarization of the image;

a controller that modifies the device to change the phase retardation states of the liquid crystal panels; and an image processor subsystem coupled to the image viewing subsystem to generate a composite image from two or more of the images, wherein the images are formed at predetermined focal distances at a rate in a range from about 15 images/second to 100 images/second.

20. The imaging system of claim 19, wherein the viewing subsystem comprises an electronic still camera, or an electronic motion camera.

21. An imaging system that generates a series of images at varying focal distances at a rate that is faster than an integration time of an associated viewing system, to form a viewable composite image from the series of images at multiple focus depths.

* * * * *